United States Patent [19]

Slocum et al.

[11] Patent Number: 5,340,512
[45] Date of Patent: Aug. 23, 1994

[54] POLYMER CONCRETE ELECTRICAL INSULATOR AND METHOD AND APPARATUS FOR MAKING

[75] Inventors: John Slocum; Peter N. Kiproff, both of Germantown; Daryl Gibson, Memphis; Will Merritt, Collierville, all of Tenn.

[73] Assignee: Thomas & Betts Corporation, Memphis, Tenn.

[21] Appl. No.: 11,437

[22] Filed: Jan. 29, 1993

[51] Int. Cl.$^5$ .................... B29C 31/04; B29C 39/42
[52] U.S. Cl. .................... 264/37; 249/160; 264/102; 264/225; 264/226; 264/310; 264/333; 264/DIG. 78; 425/146; 425/258; 425/435; 425/470; 425/405.1; 425/408; 425/DIG. 44
[58] Field of Search ........... 264/102, 256, DIG. 78, 264/37, 310, 333, 225, 227; 425/444, 389, 405.1, 408, 146, 258, 546, 435; 249/160, 161, 90, 114.1

[56] References Cited

U.S. PATENT DOCUMENTS

| | | | |
|---|---|---|---|
| 2,101,776 | 12/1937 | Feldman | 18/33 |
| 2,259,465 | 10/1941 | Hardy | 29/1 |
| 2,846,726 | 8/1958 | Bean | 264/333 |
| 2,862,239 | 12/1958 | Pollard et al. | 18/30 |
| 2,894,288 | 7/1959 | Brindis | 18/55.05 |
| 2,982,997 | 5/1961 | Peichii et al. | 18/42 |
| 3,154,618 | 10/1964 | Baer et al. | 264/299 |
| 3,193,884 | 7/1965 | Haynie et al. | 18/42 |
| 3,351,983 | 11/1967 | Grigull | 18/30 |
| 3,381,339 | 5/1968 | Trelease | 425/405.1 |
| 3,619,447 | 11/1971 | Kerna et al. | 264/102 |
| 3,621,892 | 11/1971 | Gillespie | 141/7 |
| 3,776,683 | 12/1973 | Putzer et al. | 425/440 |
| 3,886,252 | 5/1975 | Eker et al. | 264/225 |
| 3,989,790 | 11/1976 | Bruner et al. | 264/225 |
| 4,072,738 | 2/1978 | Pierson et al. | 264/102 |
| 4,098,856 | 7/1978 | Rosenaw | 264/80 |
| 4,117,060 | 9/1978 | Murray | 264/DIG. 78 |
| 4,130,536 | 12/1978 | Reighter | 252/63.2 |
| 4,138,086 | 2/1979 | Mizutani et al. | 249/116 |
| 4,142,888 | 3/1979 | Rozmus | 264/102 |
| 4,160,003 | 7/1979 | Kozuka et al. | 264/226 |
| 4,165,158 | 8/1979 | Trainicek | 351/160 |
| 4,210,774 | 7/1980 | Perry | 174/140 |
| 4,256,444 | 3/1981 | Suter | 425/73 |
| 4,267,402 | 5/1981 | Reighter | 264/71 |
| 4,321,223 | 3/1982 | Nakahara | 264/333 |
| 4,439,386 | 3/1984 | Antczak | 264/102 |
| 4,536,364 | 8/1985 | Lindskog | 264/227 |
| 4,611,980 | 9/1986 | Tsuji et al. | 264/310 |
| 4,798,364 | 11/1989 | Scott | 249/189 |
| 4,840,754 | 6/1989 | Brown et al. | 264/2.2 |
| 4,859,394 | 8/1989 | Benton et al. | 264/225 |

FOREIGN PATENT DOCUMENTS

| | | | |
|---|---|---|---|
| 2376739 | 9/1978 | France | 264/225 |
| 47-16071 | 5/1972 | Japan | 264/310 |
| 2-297402 | 12/1990 | Japan | 264/102 |
| 1166307 | 10/1969 | United Kingdom | 264/225 |

*Primary Examiner*—Jeffery Thurlow
*Attorney, Agent, or Firm*—Thomas & Betts Corporation

[57] ABSTRACT

An improved electrical insulator for high voltage transmission lines is formed from certain polymer-based concrete compositions. An apparatus provides for the molding of the polymer-based mixture to form a highly degassed product. The method and apparatus include the ability to combine the constituents of the mixture in a mixer. A vacuum is applied to the mixture to degas the mixture. A mold is filled with the degassed mixture without introducing air thereinto in the absence of a vacuum. The resulting insulator has highly reduced air entrainment.

34 Claims, 9 Drawing Sheets

POLYMER CONCRETE ELECTRICAL INSULATOR AND METHOD AND APPARATUS FOR MAKING

FIELD OF THE INVENTION

The present invention relates to polymer concrete electrical insulators and methods and apparatus for making the same and, more particularly, to an improved insulator having reduced air entrainment and an improved method and apparatus for molding products from degassed compositions.

BACKGROUND OF THE INVENTION:

For many years, electrical insulators intended for usage on high voltage transmission lines were made of porcelain. In recent years, it has been discovered that such insulators may be formed from certain polymer-based concrete compositions to provide significant advantages in cost and performance. U.S. Pat. No. 4,210,774, issued Jul. 1, 1980, for example, discloses such a polymer filled concrete composition used to produce insulators having dielectric and mechanical characteristics far superior to those of porcelain insulators. The '774 patent discloses that polymer concrete insulators may be formed by generally conventional casting or molding techniques, wherein the mold is simultaneously vibrated and subjected to a vacuum during the curing process to extract entrained air from the composition. It is well known that increased porosity through air entrainment adversely affects the dielectric and mechanical strength of the insulator, encouraging the formation of electrically charged areas within the body of the insulator which may eventually lead to failure.

The use of a vacuum to degas products during the molding process is well known in the art. U.S. Pat. Nos. 3,154,618, issued Oct. 27, 1964, and 4,256,444, issued Mar. 17, 1981, illustrate typical examples of casting and injection molding methods and apparatus known in the art, wherein the mold itself is maintained under a vacuum during at least part of the curing process. Each time the mold is removed from conventional apparatus, the vacuum must be broken and re-established for the next molding cycle. No known method or apparatus allows multiple molding cycles to be carried out without repeatedly subjecting the mold to alternating cycles of vacuum and atmospheric pressure. It has been recognized that substantial amounts of time and energy are required in order to repeatedly subject a mold to a vacuum suitable for degassing each production cycle.

Polymer concrete typically comprises the combination of one or more aggregate materials, a polymer resin, and a catalyst which, when combined with the polymer resin, forms a catalyzed composition hardenable at room temperature. It is known in the art that casting methods and apparatus for use with such compositions must be specially adapted to avoid undesirable clogging caused by premature hardening of the composition. U.S. Pat. No. 2,862,239, issued Dec. 2, 1958, for example, discloses injection molding processes and apparatus wherein catalyst and resin are combined immediately prior to entering an injection pipe leading to a mold, with solvent tanks operatively connected to clean the system of the rapidly setting composition after each injection. The mixing means disclosed in the '239 patent, however, is suitable only for combining relatively low viscosity constituents, and is inadequate for thoroughly combining the high viscosity resin/aggregate mixture with a low viscosity catalyst used to produce polymer concrete.

It is also well known in the art of casting and molding to employ a mold having a generally rigid outer structure, with a generally pliable liner forming the interior cavity configured to receive the molding composition. Room temperature vulcanizing silicone rubber (RTV) is commonly used for creating molds, as disclosed in U.S. Pat. Nos. 4,098,856, issued Jul. 4, 1978, and 3,989,790, issued Nov. 2, 1976. Conventional RTV-lined molds used for casting concrete polymer insulators typically comprise two substantially identical halves, having essentially planar mating surfaces which allow an unacceptable amount of flash to form on the finished product. The unusually high degree of flash formed on concrete polymer insulators requires a significant amount of hand finishing to remove, a time consuming process which frequently increases the cost of the end product. Numerous solutions to this problem have been attempted, but none found to be commercially feasible.

BRIEF SUMMARY OF THE INVENTION

It is a principal object of the present invention to provide an improved polymer concrete electrical insulator, and method and apparatus for producing the same, correcting the aforementioned deficiencies in the prior art. More particularly, it is an object of this invention to provide polymer concrete electrical insulators having consistently lower porosity (i.e., proportional air entrainment) than conventionally made polymer concrete insulators, and a method and apparatus for making the same.

It is another object of this invention to provide a mold for significantly reducing the amount of flash formed on polymer concrete insulators, or other molded products.

Another object of this invention is to eliminate the need for exposing the mold to the vacuum at any time during the process of degassed constituents molding.

A still further object of this invention is to provide a method and apparatus for producing a homogenous catalyzed composition suitable for molding.

Another object is to provide such apparatus adapted for use with high viscosity constituents as used to produce polymer concretes.

In accordance with the teachings of the present invention, there is disclosed herein a polymer concrete electrical insulator having substantially reduced air entrainment over conventional products. A method and apparatus for molding the improved insulator is disclosed, comprising a mixing chamber for combining the resin and aggregate constituents for a polymer concrete, with a vacuum pump communicating therewith to degas the mixed constituents. A pair of double diaphragm pumps are utilized to transfer the degassed mixture from the mixer to the top portion of a vertically oriented static mixer, at which point catalyst is added to the mixture by means of a poppet valve-operated injector. The combined catalyst and resin proceed through the static mixer to form a substantially uniform catalyzed mixture, which is then discharged into a rotating mold through a discharge nozzle which is gradually withdrawn from the mold as it fills. The unique mold comprises an outer canister having an RTV silicone rubber liner formed therein, the interior cavity formed by the liner defining the configuration of the molded insulator. The RTV liner is composed of two mating halves, the concave mating surface of one such half being defined by a naturally forming meniscus of the RTV compound, and the other half comprising a corresponding convex surface, such that the mating of the two halves minimizes the formation of flash on the resulting insulator. A recirculation system is in fluid communication with the mixer, whereby the resin/aggregate mixture may be recirculated through the evacuated portion of the mixer to ensure adequate degassing thereof, and continuously recirculated thereafter in its degassed state without allowing air to become entrained therein. A directional control valve selectively directs the flow of degassed mixture from the recirculating system to the top of the static mixer whenever desired.

These and other objects of the present invention will become apparent from the reading of the following specification, taken in conjunction with the enclosed drawings and following claims.

DETAILED DESCRIPTION OF THE PREFERRED EMBODIMENT

Figure 1:
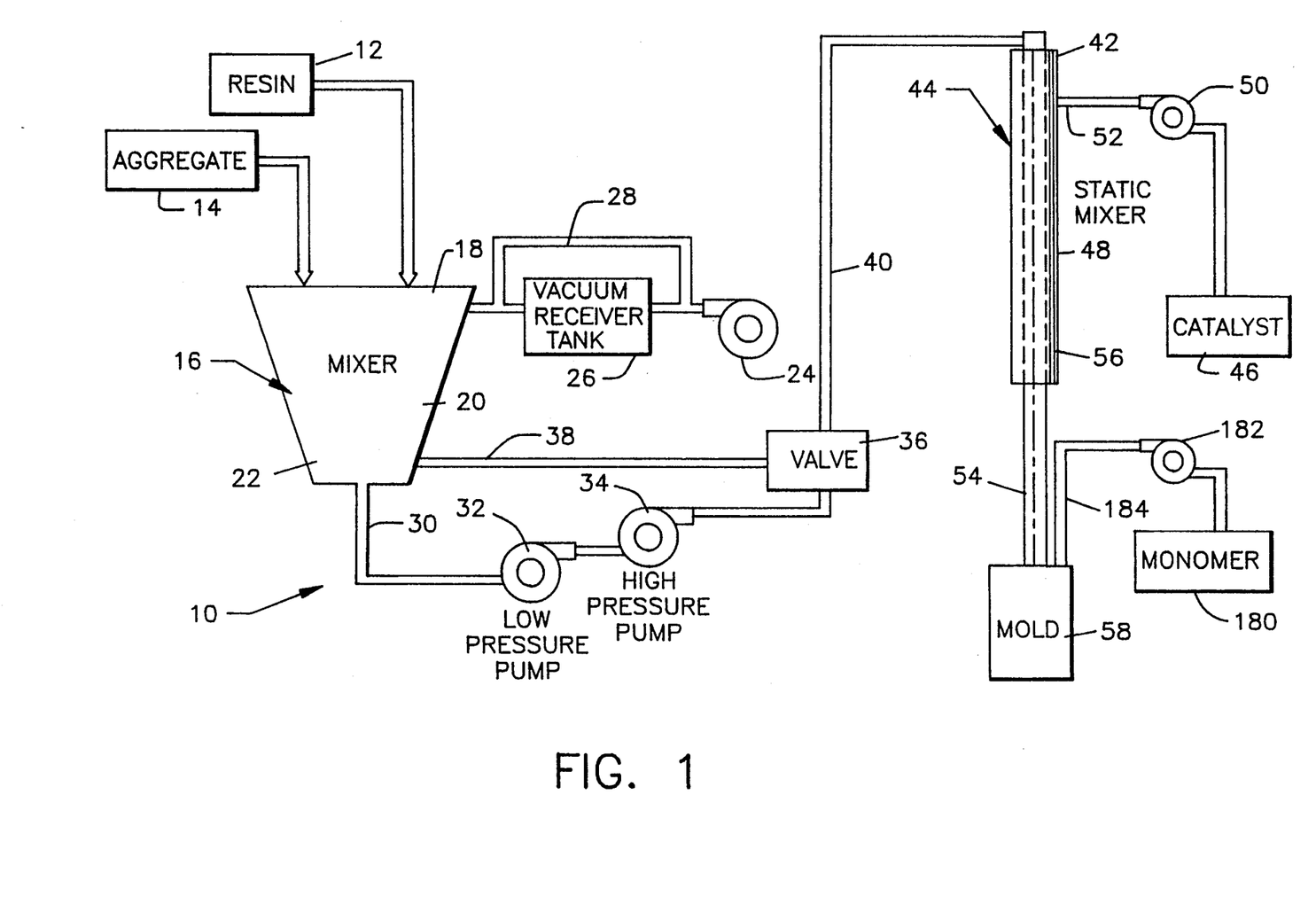
FIG. 1 is a schematic diagram of the improved molding method and apparatus of the present invention.

Referring initially to FIG. 1, molding apparatus 10 is shown diagrammatically to illustrate the unique molding method and apparatus provided by the present invention which produces a higher quality polymer concrete electrical insulator than is available with conventional methods and devices. Apparatus 10 comprises generally conventional tank 12 and hopper 14 serving as reservoirs for supplying resin and aggregate, respectively. While the advantages provided by apparatus 10 and the underlying molding method may be equally applicable to a wide range of molded products, apparatus 10 was designed for use with combined resins and aggregates typically used to produce polymer-based concretes. For purposes of this disclosure, it is to be understood that the resin supplied by tank 12 may be a mixture of polymers, monomers, and other suitable resins, while the aggregate supplied by hopper 14 may be a suitable commercially available treated filler, comprising a combination of various mineral compounds and other components. Accordingly, the terms "resin" and "aggregate", as used herein, are not to be limited to any single resin or aggregate, and the term "resin mixture" shall refer to the combination of resins and aggregates suitable for the purpose of making polymer concrete.

Resin from tank 12 and aggregate from hopper 14 are combined within mixer 16 in predetermined proportions to yield a suitable resin mixture. The nature of mixer 16 is generally not critical, provided that an adequate resin mixture may be obtained, but a conventional orbital type vertical cone screw mixer has been found particularly well suited for the purposes and advantages described herein. As will be recognized by those skilled in the art, the top section 18 of mixer 16 is adapted to receive resin and aggregate, middle section 20 is adapted to contain the resin and aggregate during thorough mixing and degassing thereof, and lower section 22 is adapted to contain and discharge the uniform resin mixture through conventional means.

Vacuum pump 24 is operatively connected to the top section 18 of mixer 16 through conventional plumbing and valving. Vacuum pump 24 serves to draw a vacuum within the interior of mixer 16, thereby suitably degassing the resin mixture contained therein. In the preferred embodiment shown, an initial vacuum is drawn within mixer 16 by means of vacuum receiver tank 26, which is maintained in a substantially continuous evacuated state by vacuum pump 24. Subsequently, vacuum pump 24 may communicate directly with tank 16 through vacuum line 28 to maintain the desired reduction of pressure within mixer 16. A significant advantage over conventional methods and apparatus is that, by selecting mixer 16 having an appropriate capacity depending upon anticipated production schedules, a sufficient quantity of resin mixture may be degassed through a single operation of vacuum pump 24 to fulfill one or more complete production shifts. Once the resin mixture within mixer 16 is suitably degassed, vacuum pump 24 may remain idle for several hours or days, thereby conserving time and energy and significantly increasing the life of vacuum pump 24.

Conduit 30 interconnects lower section 22 of mixer 16 with lower pressure pump 32 and high pressure pump 34, which cooperate to provide a steady of flow of degassed resin mixture through valve 36. Pumps 32 and 34 are of generally conventional double diaphragm design, the details of high pressure pump 34 being set forth in U.S. Pat. No. 4,543,044, issued Sep. 24, 1985. The use of a rolling diaphragm piston pump as described in the '044 patent for pump 34 ensures a non-pulsating, constant-flow polymer concrete delivery system with precision metering capability. Such pumps further ensure that no unwanted air will be inadvertently introduced into the flow of degassed resin mixture. Other pumps may also be well-suited for these purposes.

Valve 36 is selectively switchable to route the flow of degassed resin through either recirculating line 38 or discharge line 40. When switched to the former setting, valve 36 completes a recirculating loop wherein degassed resin mixture exiting conduit 30 is continuously reintroduced into mixer 16 through recirculating line 38. With all relevant components being properly sealed, the recirculation circuit may be utilized to continuously recirculate degassed resin mixture between molding cycles without the introduction of air, thereby ensuring a constant supply of flowable, degassed resin mixture.

In the preferred embodiment of this invention, it is only necessary to evacuate mixer 16 temporarily to obtain an adequately degassed mixture. Thereafter, mixer 16 need not be sealed in order to maintain the mixture in its degassed state, provided that no air is introduced during recirculation. In this regard, it is preferred that the level of mixture within mixer 16 be maintained above the point of attachment of line 38, so that the recirculating mixture is always reintroduced into mixer 16 at a point below the surface of the mixture within mixer 16, thereby avoiding air entrainment. If recirculation is performed at a sufficiently low flow rate, such an arrangement is not essential to the successful operation of this invention; the flow of mixture being reintroduced into mixer 16 may be low enough to avoid air entrainment, even if it is at a point above the level of the mixture within mixer 16.

With valve 36 in its second position, resin mixture flows through discharge line 40 and valve 41 to the top portion 42 of static mixer 44, which is of generally conventional design. A suitable catalyst, provided by catalyst tank 46, is then injected into the flow of resin mixture and uniformly combined therewith as the flow passes through the intermediate body portion 48 of static mixer 44. Pump 50, preferably a microprocessor controlled gear-styled metering pump, introduces the proper amount of catalyst depending upon the resin mixture flow rate through catalyst injector 52 described in more detail below. The uniform combination of catalyst and resin mixture forms a readily hardenable catalyzed composition which passes through fill tube 54 secured to the outlet end 56 of static mixer 44, for ultimate discharge into a mold 58 as described more fully hereinbelow.

Figure 2A:
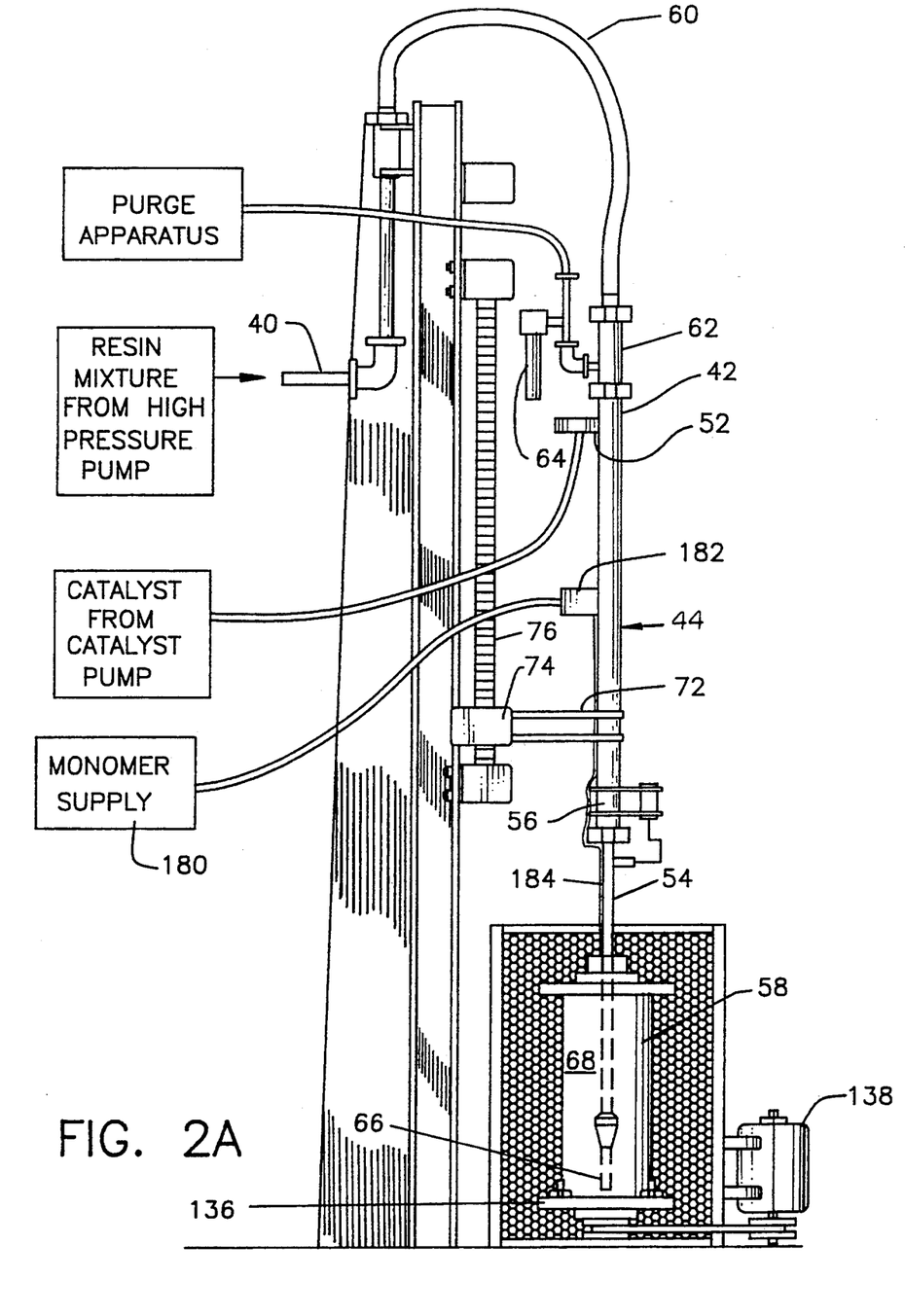
FIG. 2A is a side elevational view of the fill station of the molding apparatus of the present invention, showing the fill tube nozzle in its fully inserted position within the mold cavity.
Figure 2B:
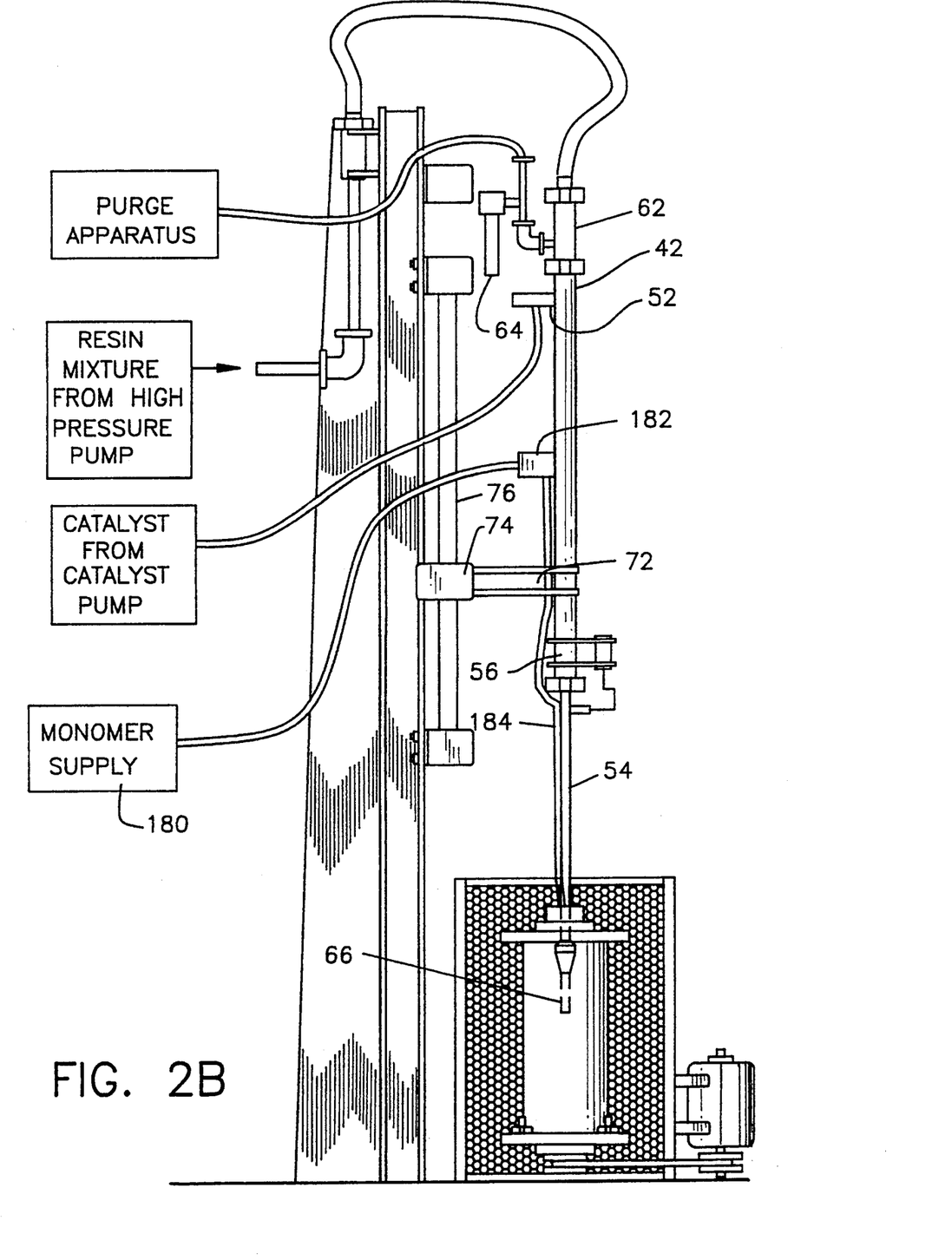
FIG. 2B is a side elevational view similar to FIG. 2A, showing the fill tube nozzle in an intermediate position between its fully inserted and fully retracted positions.
Figure 2C:
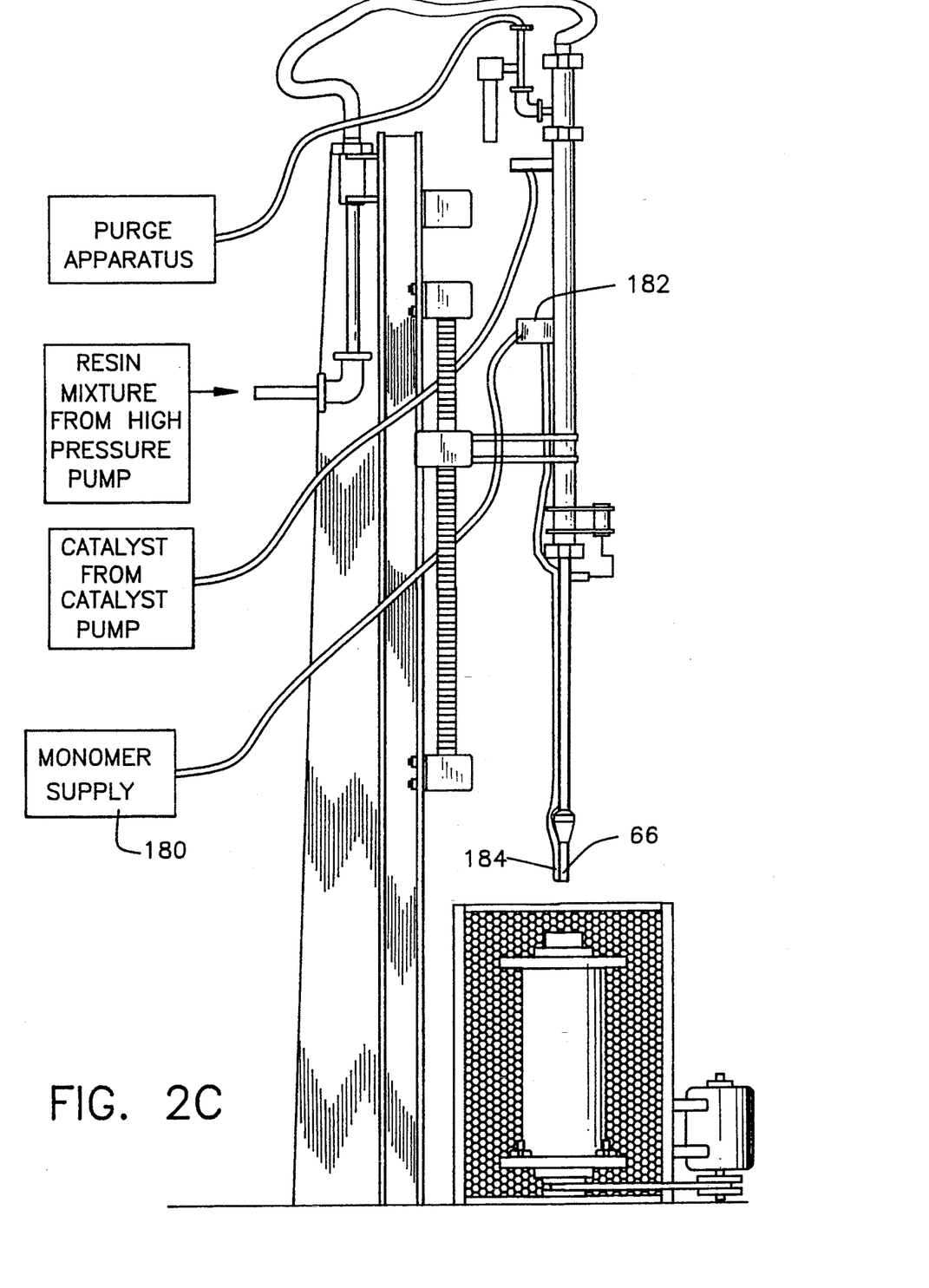
FIG. 2C is a side elevational view similar to FIGS. 2A and 2B, showing the fill tube in its fully retracted position.

FIGS. 2A through 2C illustrate, in some detail, the preferred embodiment of the mold fill station of the apparatus depicted diagrammatically in FIG. 1. Discharge line 40 leading from high pressure pump 34 communicates through flexible hose 60 and coupling 62 with the inlet end 42 of static mixer 44. A pair of purge valves 64 (only one is shown for the sake of clarity) are operatively disposed between fluid lines connecting coupling 62 with conventional supplies of solvent and air. Activating purge valves 64 serves to alternatingly direct a suitable cleaning solvent and/or air through static mixer 44 and fill tube 54, discharged through nozzle 66. The purging operation effectively cleans the system between valve 41 and the distal end 144 of nozzle 66, thereby removing all unused catalyzed composition remaining therein. Valve 41, maintained in its closed position during purging, prevents air and solvent from being introduced in the resin mixture upstream of purge valves 64.

As discussed more fully below, nozzle 66 is preferably withdrawn from the interior cavity 68 of mold 58 during discharge of the catalyzed composition. Therefore, the assembly comprising coupling 62, static mixer 44, and fill tube 54 are longitudinally movable as a unit, by means of a generally conventional linear actuator. While a number of linear actuators may be suitable for this purpose, the embodiment disclosed herein utilizes bracket 72 to rigidly secure static mixer 44 to nut 74 which is threadingly engaged with threaded rod 76. Rotation of threaded rod 76 by means of a suitable motor (not shown) engaging either end thereof moves nut 74 vertically, with the static mixer 44 and fill tube 54 moving therewith. FIG. 2A demonstrates nozzle 66 in its fully inserted position within interior cavity 68, FIG. 2B demonstrates nozzle 66 in an intermediate position, and FIG. 2C demonstrates nozzle 66 in a fully retracted position.

Figure 3A:
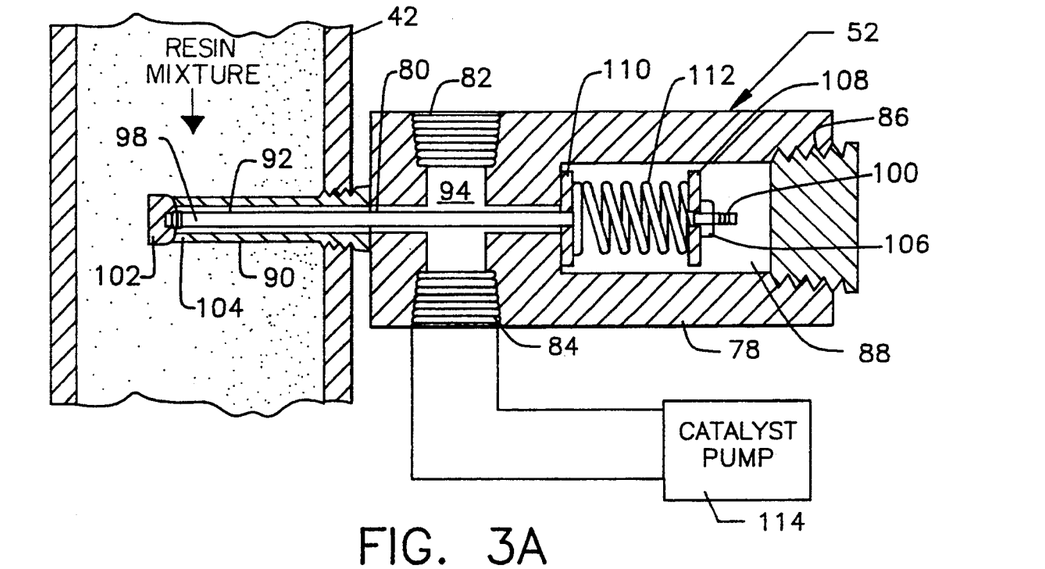
FIG. 3A is a side sectional view of the catalyst injector and top portion of the static mixer of the present invention, with the injector valve in its closed position.
Figure 3B:
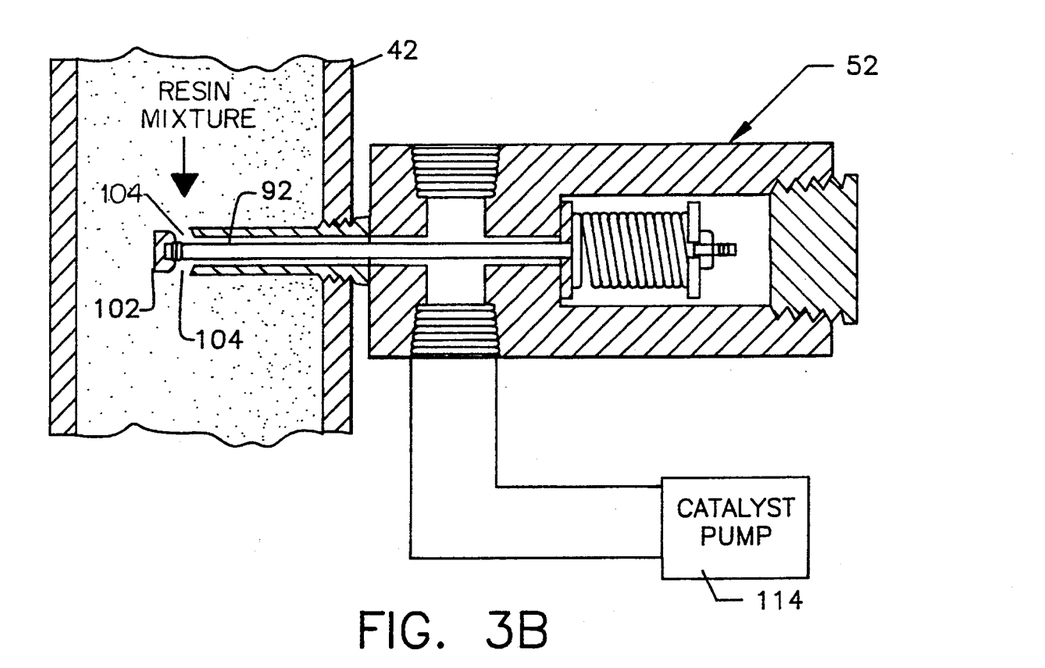
FIG. 3B is a side sectional view similar to FIG. 3A, showing the injector valve in its open position.

FIGS. 3A and 3B disclose more fully the preferred embodiment of catalyst injector 52, representing a superior method for combining catalyst with a resin mixture for purposes of molding. Body 78 of catalyst injector 52 preferably includes four bores 80-86 formed therein, with ports 82 and 86 normally plugged during operation. While port 86 is formed in conjunction with bore 88 and provides access thereto, port 82 may serve as a connection to a second supply of catalyst in the event that hardening of the particular mixture is optimized by the addition of a plurality of catalysts.

Nozzle member 90 is welded or otherwise rigidly secured to the face of body 78 and threaded into the side of top portion 42, such that the interior bore 92 is in fluid communication with passageway 94 formed within body 78. Stem 96 is disposed longitudinally through nozzle 90 and body 78, having longitudinally opposed threaded ends 98 and 100. Valve member 102 is threaded onto end 98 of stem 96, and is configured to sealingly engage seat 104 formed in the distal end of nozzle member 90. Disposed within bore 88, nut 106 is threaded onto end 100 of stem 96, thereby securing compression spring 112 between washers 108 and 110.

When assembled as shown, compression spring 112 serves to bias catalyst injector 54 in its closed position, as illustrated in FIG. 3A. Upon operation of catalyst pump 114, the tension provided by compression spring 112 is overcome by the pressure of the catalyst, thereby unseating valve member 102 from seat 104 to allow catalyst to be injected into the flow of resin mixture. The catalyst and resin mixture are then substantially uniformly combined by the continuous flow through static mixer 44, thereby forming a fully catalyzed hardenable composition suitable for molding.

Valve 41, preferably a pneumatically-activated ball valve, selectively controls the passage of resin mixture from discharge hose 60 into coupling 62, where resin is introduced through injector 52 as described above. In the preferred embodiment illustrated, valve 41 is synchronized with valve 36, so that both valves are simultaneously moved to either the open or closed position. Additionally, catalyst pump 114 is operated briefly prior to the opening of valve 41 during initial operation of molding apparatus 10, and valve 41 is closed just prior to stopping catalyst pump 114, to ensure that all resin mixture is fully catalyzed. The pressure of the resin mixture created by pump 34 effectively prevents backflow of catalyzed composition during the filling operation, while valve 41, in its closed position, prevents backflow between filling cycles.

FIGS. 4A–4D illustrate yet another unique feature of the molding method and apparatus taught by the present invention. Outlet end 56 of static mixer 44 is secured to fill tube 54 by means of collar 116 threadingly engaging the upper threaded portion of fill tube 54. Actuator 118 is attached exteriorly to outlet end 56 by clamps, screws, or other suitable means. Actuator 118 may be operated hydraulically, pneumatically, or in any other manner suitable for the purposes described herein. Actuator 118 selectively allows the hardenable polymer concrete composition to be discharged into mold 58 in a controlled manner. The distal end of piston 120 is secured to rocker arm 122 inserted through tube 124 which is attached to the upper end of fill tube 54 and provides access to the interior thereof. Rocker arm 122 passes through ball mechanism 126, which sealingly engages the interior passageway of tube 124 while allowing free rotation of rocker arm 122 about its transverse horizontal axis.

Figure 4A:
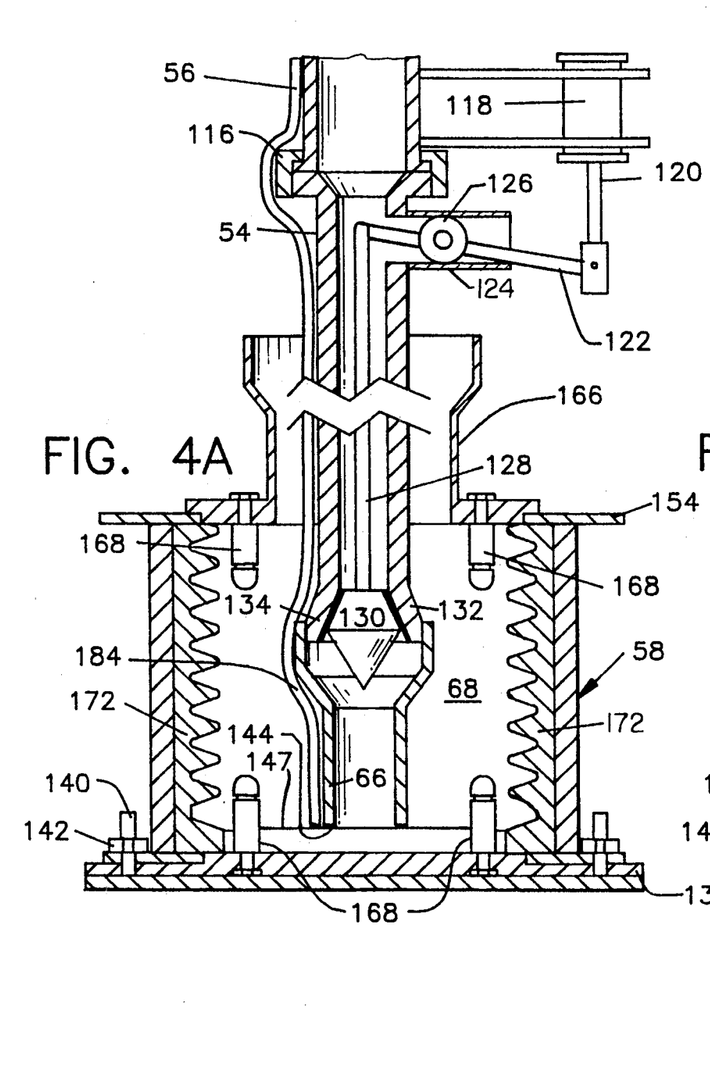
FIG. 4A is a side sectional view of the improved mold of the present invention with the discharge end of the fill tube inserted therein, shown prior to filling.

The opposite end of rocker arm 122 is operatively attached to the upper end of the stem 128, the lower end of stem 128 being secured to valve member 130. The lower end 132 of fill tube 54 has valve seat 134 formed therein, with the upper, frustro-conical outer side surface of valve member 130 being configured to form a seal therein. As shown in FIG. 4A, the downward position of piston 120 corresponds to the closed position for valve member 30, wherein the hardenable concrete composition is prevented from being discharged through nozzle 66 which is threadingly engaged to lower end 132 of fill tube 54. Activation of actuator 118 moves piston 120 to its upper position, as shown in FIGS. 4B–4D, whereupon valve member 130 is moved downwardly to its open position to allow the free discharge of the catalyzed composition.

Figure 4B:
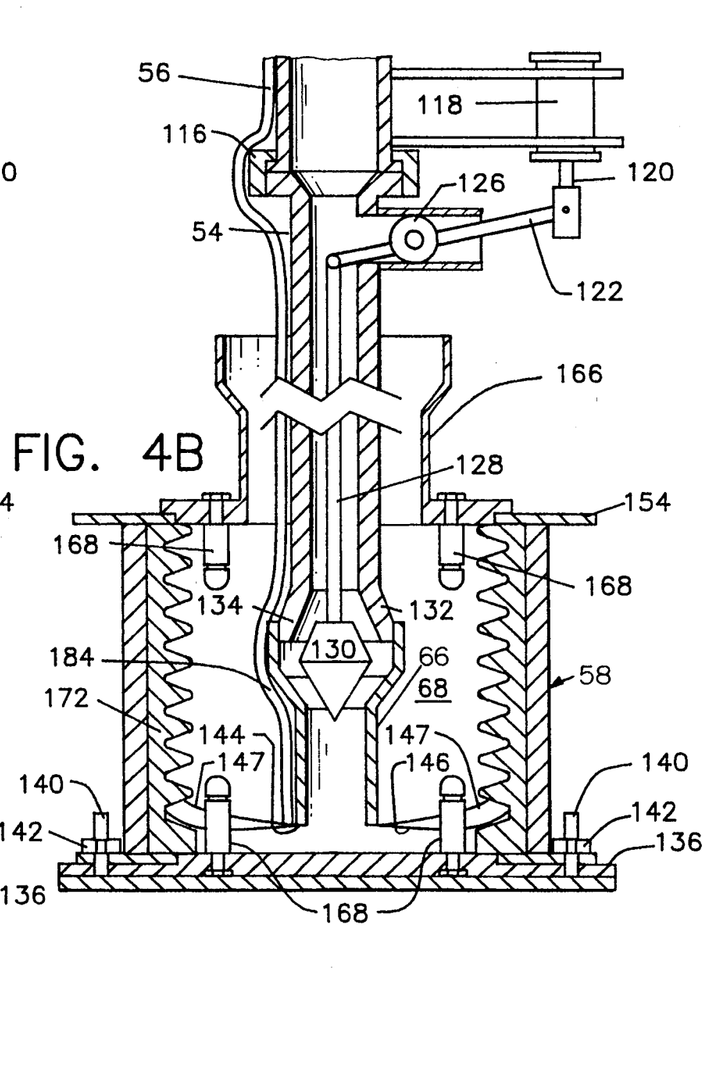
FIG. 4B is side sectional view similar to FIG. 4A, showing the molding composition being discharged into the mold.
Figure 4C:
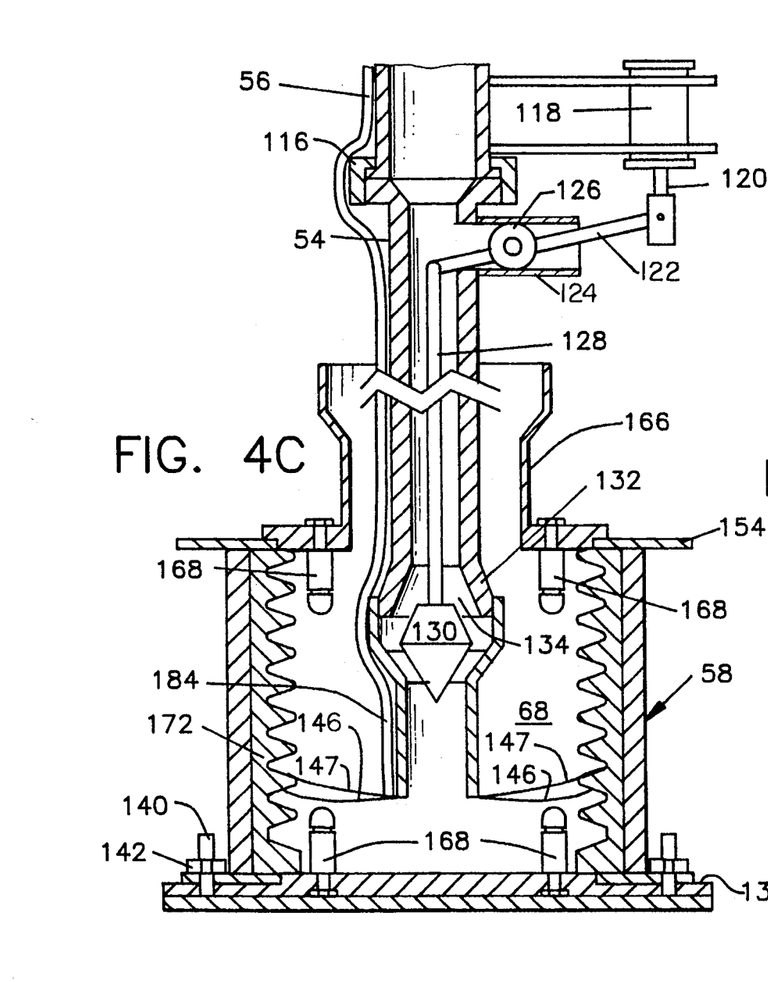
FIG. 4C is a side sectional view similar to FIGS. 4A and 4B, showing the fill tube being raised as the molding composition is discharged into the mold.
Figure 4D:
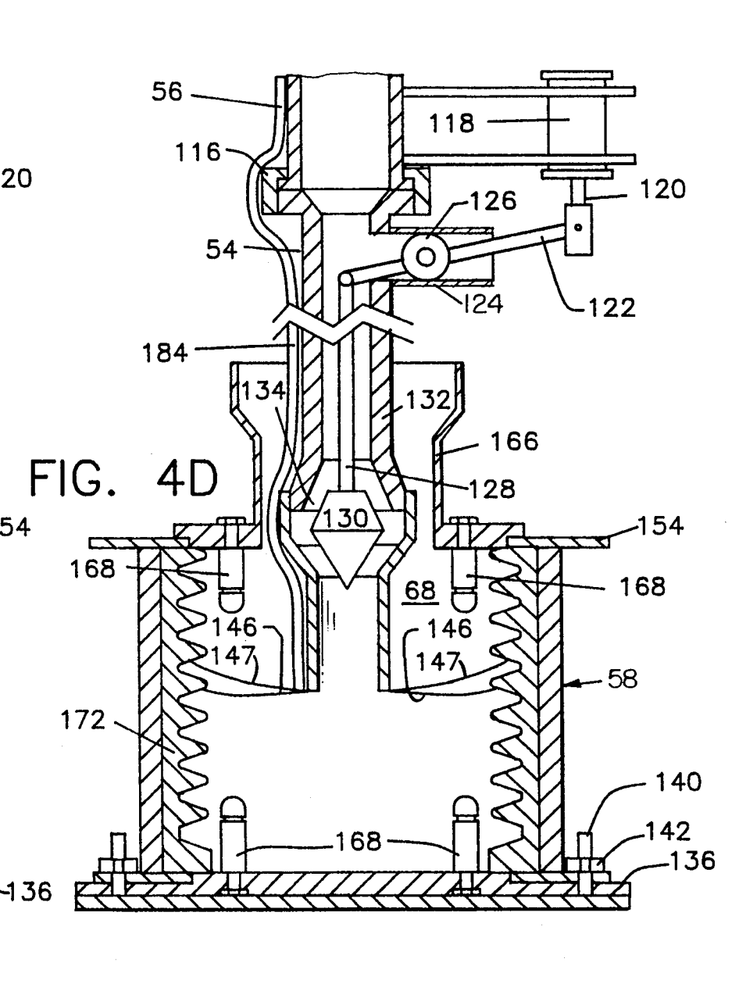
FIG. 4D is a side sectional view similar to FIGS. 4A, 4B, and 4C, showing the fill tube being raised as the molding composition fills the mold.

FIG. 4B illustrates nozzle 66 in its fully inserted position within interior cavity 68 of mold 58, during the initial discharge stage of catalyzed concrete composition. Just prior to the discharge of concrete composition, or substantially simultaneously therewith, table 136 is rotated about its vertical axis by operation of motor 138 (see FIGS. 2A–2C). Rotation of table 136 effects corresponding rotation of mold 58, as mold 58 is anchored to table 136 by bolts 140 and nuts 142 or other suitable means. It may be preferable to utilize a quick coupling system to secure mold 58 to table 136, such as a plurality of centrifugally operable latches which automatically engage upon rotation of table 136.

As discussed above, selective rotation of threaded rod 76 causes vertical, longitudinal movement of static mixer 44 and fill tube 54, from coupling 62 through the distal end 144 of nozzle 66. This feature, particularly when used in conjunction with the rotation of table 136, greatly improves the ability of the present invention to mold solid objects without undesirable air entrainment over molding methods and apparatus known in the industry. The rotation of table 136 at an appropriate speed causes the concrete composition to flow radially outwardly from nozzle 66, thereby avoiding the formation of air pockets within the concrete composition. The rotation of table 136 and mold 58 causes a vortex to form within the concrete composition with distal end 144 being slightly submerged in the center. As the concrete composition is discharged, nozzle 66 is gradually withdrawn from cavity 68, with the concrete discharge rate and actuation of threaded rod 76 being synchronized such that distal end 144 of nozzle 66 remains in contact with the top surface 146 of the polymer concrete composition and, preferably submerged slightly therein. It has been found that, by maintaining distal end 144 slightly submerged beneath the top surface 146, it is possible to avoid the entrainment of air about the longitudinal axis of the insulator which could otherwise result from the naturally occurring turbulence in the vicinity of the nozzle caused by the rotation of mold 58.

It has been found preferable to inject a small quantity of a suitable monomer into mold cavity 68 prior to the injection of concrete composition as discussed above. For this purpose, monomer supply tank 180 and pump 182 are provided to initially inject the desired amount of monomer into cavity 68 through auxiliary tube 184. Pump 182 may be of purely conventional design, such as a piston pump, and may be secured to static mixer 44 and moveable therewith, communicating with tank 180 through a flexible hose. It will be appreciated that the manner of injecting monomer into cavity 68 is largely inconsequential for purposes of this invention, and the apparatus disclosed herein is by way of example only and not to be deemed a limitation.

The monomer initially injected into cavity 68, identified by reference numeral 147 in FIGS. 4A–4D, is displaced during the filling process by the concrete mixture, and is maintained in contact with the interior surface of the mold cavity 68 by the centrifugal force generated upon rotation of mold 58, thereby pre-wetting the surface of the mold. Such pre-wetting allows the concrete composition to more effectively wet the mold surface, thereby yielding a superior insulator having greatly reduced surface porosity over those produced by other known methods. Both styrene and methylmethacrylate monomers have been found suitable for this purpose, and it is expected that other monomers may also yield acceptable results. Typically, the quantity of monomer used will be approximately 50 ml but may be varied as necessary according to the size of cavity 68, and other variables as appropriate.

Figure 6:
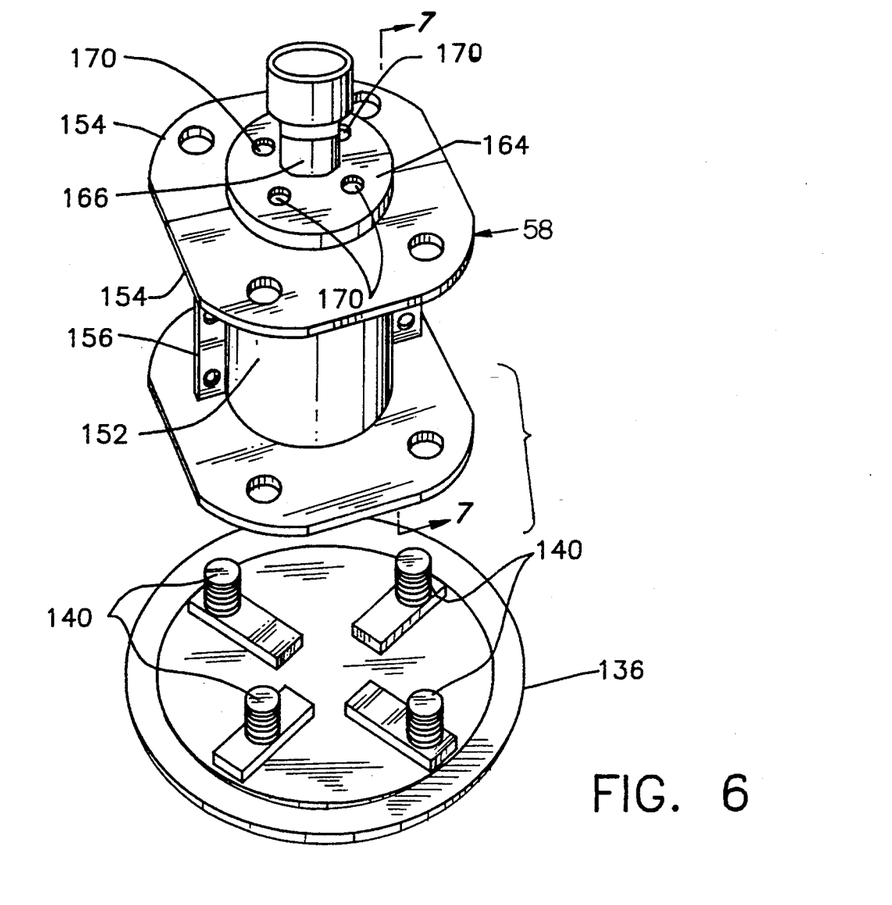
FIG. 6 is a partially exploded view of the mold and rotating table of the fill station incorporated in the molding apparatus of the present invention.

As also shown in FIGS. 4A–4D and in FIG. 6, the top portion of collar 166 is flared outwardly and serves as an overfill reservoir to retain the unused monomer 147 upon completion of the mold filling process. Collar 166 further serves to retain a certain volume of the concrete material displaced upwardly during high speed spinning of mold 58. It will be appreciated that mold 58 must be slightly overfilled during the initial filling process to ensure that sufficient material is present to fill the void created by the vortex once rotation of the mold has stopped. Collar 166 serves to contain such overfill.

At least two techniques for synchronizing the withdrawal of nozzle 66 with the rotation of table 136 have been found suitable for the production of polymer concrete electrical insulators. With the first technique, a relatively high initial rotational speed is attained with nozzle 66 in its fully inserted position, the speed decreasing gradually as nozzle 66 is withdrawn to its retracted position. Initial rotational speeds of approximately 600–700 rpm have been found successful. With the second technique, the rotational speed is maintained constant, with speeds of 250 to 450 rpm providing acceptable results. With either technique, withdrawal of nozzle 66 is carefully controlled to track the top surface 146, as mentioned above. The cross sectional area of cavity 68 typically fluctuates at various points along its longitudinal axis due to the radially finned configuration of most such electrical insulators. It is therefore necessary for the withdrawal rate of nozzle 66 to fluctuate inversely according to the cross sectional area of cavity 68 corresponding to the location of nozzle 66.

With the preferred molding method of this invention, a post spin operation is also employed after retraction of nozzle 66 to remove any air trapped within the top of cavity 68. Post spin speeds of 450 to 600 rpm maintained for a duration of thirty to sixty seconds, for example, have been found appropriate for the removal of air trapped therein.

As those skilled in the art will fully understand, the preferred method described herein requires reasonably precise control of the discharge rate of resin mixture and catalyst, rotation rate of table 136, and withdrawal rate of nozzle 66. Similarly, the operation of catalyst injector 52 and actuator 118 must be carefully controlled to ensure consistent results and minimize waste. Accordingly, it will be appreciated that generally conventional microprocessor means have been employed to control the various pumps, valves, and actuators described herein. Those skilled in the art will further appreciate that considerable variation in the controlling parameters is necessary to accommodate a wide range of molded products. Since the catalyst and resin discharge rates, rotational speed for table 136, and withdrawal rate for nozzle 66 will vary considerably depending upon the size, configuration, and composition of the insulator or other product being molded, a detailed explanation of the controlling and programming apparatus has been omitted from this specification.

Figure 5:
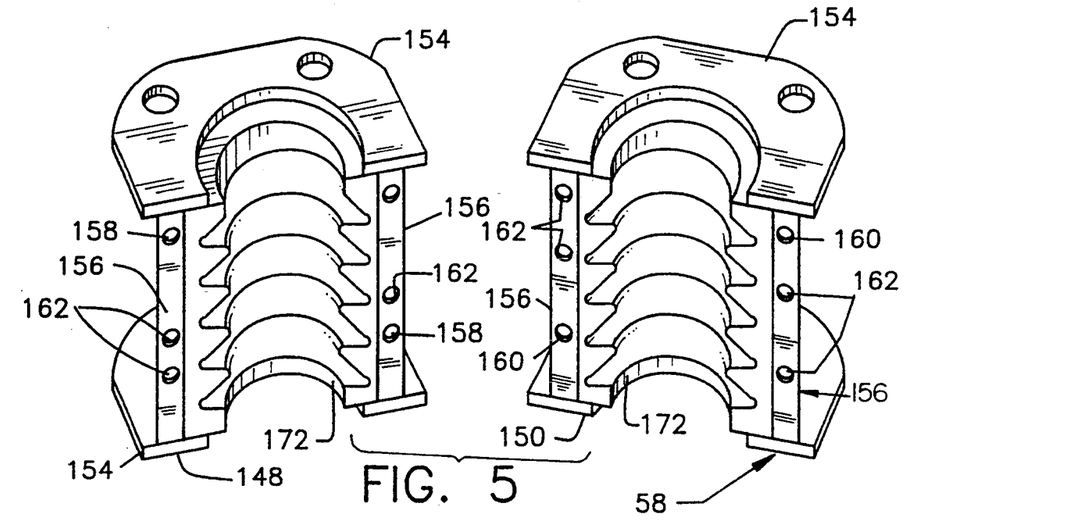
FIG. 5 is a top perspective view of the improved mold of the present invention, with the two halves separated to reveal the liner.

FIGS. 5-8 illustrate in more detail the unique structure of mold 58 which substantially reduces the amount of flash formed at the parting line with conventional molds. Referring initially to FIGS. 5 and 6, mold 58 is of a two-part "clam shell" variety, having an outer housing comprising mating halves 148 and 150. Each mating half 148 and 150 includes a generally cylindrical body portion 152, with radial flanges 154 and longitudinal flanges 156 fixedly secured thereto. Flanges 156 of body member 148 include locator posts 158 configured to engage corresponding holes 160 in body member 150, with remaining holes 162 serving to receive bolts or other fastening devices. End cap 164 is press fit into the central opening formed upon assembly of body members 148 and 150, and has collar 166 secured thereto for guiding nozzle 66 into interior cavity 68. Threaded inserts 168 may be secured by bolts through holes 170 in end cap 164 to be molded in place. (Not shown for the sake of clarity is a bottom end cap similarly installed to enclose the lower opening of mold 58 and secure threaded inserts 168, without the need for a corresponding collar 166). Finally, holes 170 in radial flanges 154 are located to receive studs 140 protruding from plate 136 for anchoring mold 58.

Figures 7, 8:
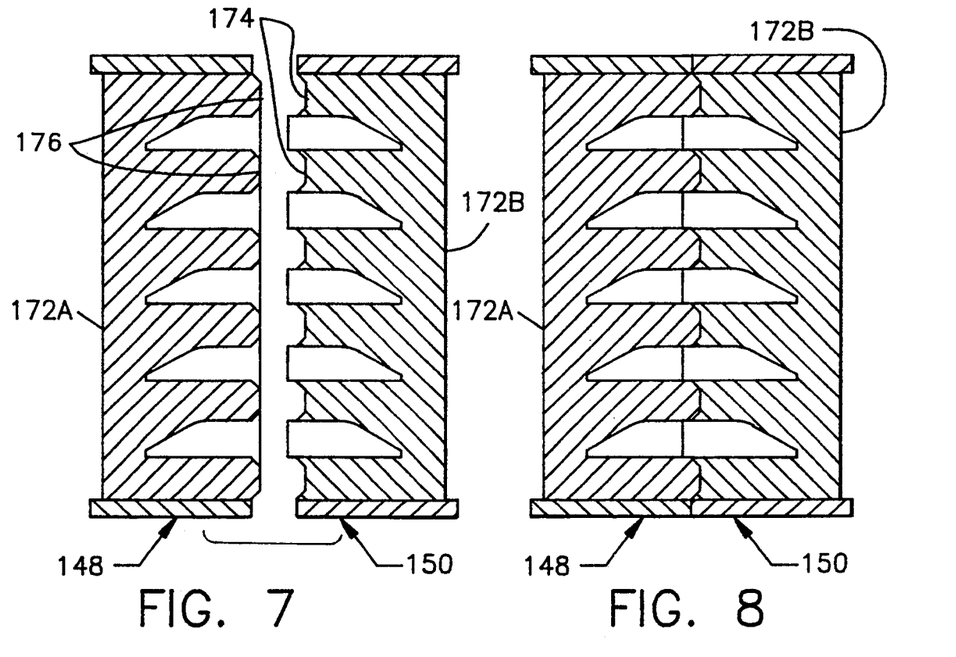
FIG. 7 is an enlarged sectional view of the improved mold liner of the present invention taken generally along line 7—7 of FIG. 6, with the two halves separated to reveal the configuration of the mating surfaces.
FIG. 8 is a side sectional view similar to FIG. 7, with the two halves closed to show the cooperating relationship between the mating surfaces.

The outer housing of mold 58 is preferably formed of aluminum or other suitably rigid material. The configuration of cavity 68, however, is defined by liner 172 formed within body members 148 and 150. As illustrated in FIGS. 7 and 8, the two halves of liner 172, designated by reference numerals 172A and 172B, are formed as mating pairs. As shown, surface 174 of member 172B is essentially concave, while surface 176 of member of 172A is correspondingly convex. The cooperative mating relationship between surfaces 174 and 176, upon assembly of mold 58, substantially reduces the amount of flash formed at the parting line when compared to products made with conventional molds.

Liners 172A and 172B are preferably formed from a suitable room temperature vulcanizing silicon rubber (RTV) that is easily cast around a conventional pattern plug to form cavity 68. In order to obtain the unique configuration of surfaces 174 and 176, 172B is first cast within housing 150, with a suitable pattern plug held in position by conventional means. With housing member 150 maintained in a horizontal position, the surface tension properties of the curing RTV create a concave meniscus which, upon final curing, forms surface 174. After the application of a release agent on surface 174, suitable for use with RTV rubber, housing member 148 is placed in position and a second quantity of RTV poured therein, with surface 174 being used as the molding pattern to produce mating surface 176 in member 172A. When formed in this manner, a substantially perfect fit is obtained between surfaces 174 and 176.

Figure 9:
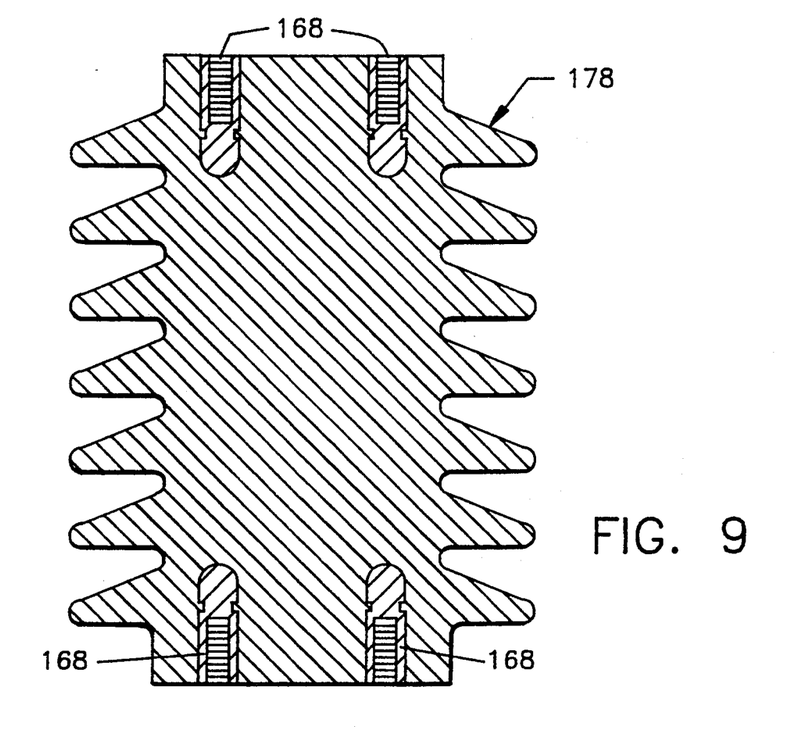
FIG. 9 is a side sectional view of the improved electrical insulator of this invention.

FIG. 9 illustrates a cross sectional view of an electrical insulator 178 produced in accordance with the teachings of the present invention. Insulator 178 includes a plurality of threaded inserts 168 molded therein, as described generally herein. Typically, insulator 178 will include four inserts 168 in each end thereof, but those skilled in the art will readily understand that any number of inserts 168, or similar fastening means, may be utilized with insulator 178. By incorporating the principles of the method and apparatus described herein, insulator 178 has a significantly lower percentage of air inclusion than conventional insulators. While a wide variety of polymers, monomers, aggregates, and catalysts may be employed with the improved method and apparatus disclosed herein to obtain superior insulators, it has been found that polymer concrete compositions composed of the constituents combined pursuant to the example set forth below yield exceptional results.

Polymer concrete is essentially composed of an aggregate mixture and a polymer resin, which are uniformly combined and mixed with a suitable catalyst prior to casting. For the purposes of this invention, the following aggregate mixtures have been found particularly well-suited:

| Material | Approximate Weight % |
|---|---|
| EXAMPLE 1 | |
| Silica 12-28 | 33.00% |
| Silica 20-40 | 23.98% |
| Silica 40-60 | 13.32% |
| Silica M-70 | 5.33% |
| Daper Novacite | 3.99% |
| 200 Novacite | 10.65% |
| Alumina Trihydrate | 7.99% |
| Titanium Dioxide | 1.33% |
| Ebony Novacite | 0.41% |
| | 100.0% |
| EXAMPLE 2 | |
| Silica 20-40 | 35.79% |
| Silica 40-60 | 19.88% |
| Silica M-70 | 7.95% |
| Daper Novacite | 5.96% |
| 200 Novacite | 15.90% |
| Alumina Trihydrate | 11.93% |
| Titanium Dioxide | 1.99% |
| Ebony Novacite | 0.60% |
| | 100.0% |

Each of the aggregate blends set forth in Examples 1 and 2 above should be treated with gamma methacryloxypropyltrimethoxysilane (silane), an organo functional coupling agent providing a mechanism for chemically coupling inorganic substrates with organic polymers. The aggregate ingredients and silane should be combined by a low shear blending method, such as a baffled rotating drum similar to that of a conventional cement mixer. Silane may be applied by a sprayer operating at 35 psi during mixing. Silane treatments comprising from 0.05% to 0.3% of the total aggregate mixture weight have been found to be successful.

The preferred polymer resin for use with either of the above described aggregate mixtures is a formulation of dicyclopentadiene (DCPD) polyester. The formulation also includes 40% to 50% styrene or other suitable monomer to improve viscosity of the mixture. The preferred resin mixture formulation is as follows:

| Composition | Approximate Weight % |
| --- | --- |
| Polyester Resin/Monomer Mixture | 99.2–99.8% |
| Cobalt Naphthenate (12%) | 0.1–0.4% |
| Dimethyl Analine | 0.1–0.4% |
| Methyltertiarybutylhydroquinone | .005–.050% |

After the preferred constituents have been combined in mixer 16 and properly degassed, as set forth more fully below, the preferred catalyst employed to initiate the polymerization reaction for curing is Methylethylketone peroxide (MEKP).

A homogenized, degassed resin mixture is obtained by first providing a sufficient quantity of aggregate ingredients within mixer 16, mixer 16 preferably being of the orbital, vertical cone screw mixture type. Polymer resin ingredients are then added, and the auger within mixer 16 activated in the reverse (counter clockwise) direction for approximately thirty minutes. The auger is then reversed to operate in the forward (clockwise) director for another thirty minutes, at which point the resin mixture is sufficiently homogenized. As those skilled in the art will understand, clockwise rotation of the auger serves to move material from the top of the mixer to the bottom, and counter-clockwise rotation serves to move material from the bottom to the top. Vacuum receiver tank 26 and vacuum pump 24 are then utilized as described above to expose the homogenized resin mixture to a vacuum approaching 25 in. Hg for approximately fifteen minutes, after which continued evacuation is unnecessary. The combination of the forward (clockwise) operation of the auger to direct resin mixture from the lower section 22 to the top section 18 of mixer 16, and the evacuated environment of mixer 16, suitably degasses the resin mixture.

The principles of the present invention as applied to the production of polymer concrete electrical insulators will be fully appreciated by those skilled in the art upon reviewing the specification, claims, and drawings contained herein. Many principles of the present invention, however, are not limited to production of polymer concrete electrical insulators, and are more generally applicable to a variety of molding/casting methods and apparatus. Accordingly, it is expressly understood that the following claims are intended to cover and embrace not only the specific embodiment disclosed herein, but also such modifications and applications within the spirit and scope of this invention.

What is claimed is:

1. Apparatus for molding a mixture of constituents to form a substantially degassed molded product, comprising:
   mixing means for uniformly combining the constituents comprising said mixture;
   means for selectively evacuating said mixing means, thereby degassing said mixture;
   a mold, maintained under ambient pressure;
   means for pumping said mixture from said mixing means to said mold; and
   means for filling said mold with said degassed mixture without introducing air into said degassed mixture, said filling means comprising:
      a fill tube for directing said mixture into said mold, having first and second longitudinally opposed ends with said first end communicating with said pumping means and said second end removably insertable into said mold; and
      driving means for withdrawing said fill tube from said mold in a controlled manner, said second end of said fill tube being selectively moveable between fully inserted and fully retracted positions.

2. Molding apparatus as set forth in claim 1, wherein:
   said pumping means and said filling means are maintained under ambient pressure.

3. Molding apparatus as set forth in claim 1, wherein:
   said mixing means comprises a vertically oriented mixer, having an upper section adapted to receive said constituents of said mixture, an intermediate section adapted to substantially uniformly combine said constituents, and a lower section adapted to discharge said mixture through discharge means associated therewith; and
   said evacuating means comprises a vacuum pump operatively communicating with said upper section of said mixer.

4. Molding apparatus as set forth in claim 3, further comprising:
   recirculating means communicating with said pumping means for selectively directing said degassed mixture into either said filling means or said intermediate section of said mixer.

5. Molding apparatus as set forth in claim 1, wherein said filling means further comprises:
   a static mixer having longitudinally opposed inlet and outlet ends, said inlet end being in communication with said pumping means for receiving said degassed mixture; and
   a catalyst injector communicating with said static mixer generally adjacent said inlet end for selectively adding a measured amount of catalyst to said mixture, said static mixer being operative to substantially uniformly combine said catalyst and said degassed mixture during passage of said degassed mixture therethrough from said inlet end to said outlet end to form a catalyzed composition without adding air to said mixture; and
   said second end of said fill tube communicating with said outlet end of said static mixer whereby said fill tube is operative to direct said catalyzer composition into said mold.

6. Molding apparatus as set forth in claim 5, wherein said filling means further comprise:
   means for rotating said mold; and
   a valve member disposed in said second end of said fill tube selectively moveable between an open position, thereby allowing said catalyzed composition to exit through said second end of said fill tube, and a closed position, thereby checking the flow of said composition, whereby the filling of said mold without entrainment of air into said mixture is effected by:

securing said mold to said rotating means;

moving said second end of said fill tube to said fully inserted position; moving said valve member to its open position, thereby allowing said composition to flow into said mold;

rotating said mold, the rotation of said mold causing said composition to flow laterally outwardly within said mold, and forming a vortex within said composition;

operating said driving means to withdraw said fill tube to said retracted position as said composition fills said mold; and moving said valve means to said closed position simultaneously with said fill tube reaching said fully retracted position.

7. Molding apparatus as set forth in claim 6, wherein:
said driving means is operable to withdraw said fill tube from said mold at a rate wherein said second end of said fill tube is maintained slightly submerged in said composition generally adjacent said top surface thereof.

8. Molding apparatus as set forth in claim 6, wherein:
the interior cavity of said mold is configured to produce a product having a fluctuating cross-sectional area, determined at multiple points along the longitudinal axis of said product; and said driving means is operable to withdraw said fill tube at a rate which fluctuates inversely relative to the cross-sectional area of said interior cavity corresponding to the position of said second end of said fill tube.

9. A method of forming a substantially degassed product from moldable constituents, comprising the steps of:

combining said constituents within a mixer to form a uniform mixture;

reducing the air pressure within said mixer by an amount sufficient to substantially degas said mixture;

providing a moveable fill tube injector in communication with said mixer, adapted to selectively discharge said mixture, said fill tube having a distal end;

providing a mold having longitudinally opposed top and bottom ends and maintained at normal ambient pressure;

moving said distal end of said fill tube into said mold;

pumping said mixture from said mixer to said fill tube without adding air to said mixture;

discharging said mixture through said distal end of said fill tube into said mold while gradually withdrawing said fill tube in a controlled manner to avoid entrainment of air into said mixture.

10. The method of claim 8, further comprising the steps of:

moving said fill tube to a position wherein said distal end thereof is substantially adjacent said bottom surface of said mold;

rotating said mold at a rate sufficient to cause said mixture to flow radially outwardly from said fill tube and form a vortex thereabout; and withdrawing said fill tube from said mold at a rate sufficient to maintain said distal end in contact with said mixture.

11. The method of claim 10, wherein;
said withdrawal rate of said fill tube is sufficient to maintain at least a portion of said fill tube submerged in said mixture.

12. The method of claim 9, further comprising the steps of:

providing a supply of catalyst suitable to initiate hardening of said mixture;

adding said catalyst to said mixture at a point upstream of said injector; and mixing said catalyst throughout said mixture in a manner sufficient to avoid entrainment of air into said mixture prior to discharging said mixture through said fill tube.

13. Apparatus for molding a catalyzed composition including a resin and a catalyst, comprising:

a static mixer, having longitudinally opposed inlet and outlet ends and an intermediate mixing section;

means for supplying resin to said inlet end of said static mixer;

an injector body, secured to said static mixer generally adjacent said inlet end thereof, having an inlet port for receiving catalyst and an exit port communicating with said static mixer;

a valve seat formed within said exit port;

a valve disc member disposed within said injector body and moveable between a closed position, wherein said valve disc member engages said valve seat to form a seal, and an open position, wherein said valve disc member is spaced apart from said valve seat;

a spring member disposed within said injector body biasing said valve disc member in said closed position;

first pumping means communicating with said static mixer, producing positive pressure at said inlet end thereof, operative to force said resin and said catalyst through said mixing section and discharge said resulting catalyzed composition out through said outlet end;

second pumping means communicating with said inlet port for selectively providing catalyst under pressure into said injector body, said second pump means being operative to produce sufficient pressure within said injector body to overcome the bias of said spring member, whereby said valve disc member is moved to said open position and said catalyst is forced outwardly through said exit port; and a mold, having an internal cavity suitable for receiving said catalyzed composition discharged from said outlet end of said static mixer.

14. Molding apparatus as set forth in claim 13, further comprising:

a resin tank;

an aggregate tank;

a mixer, in communication with said inlet end of said static mixer, said resin supply means being operative to provide resin from said resin tank to said mixer; and means for supplying aggregate from said aggregate tank into said mixer, said mixer being operative to substantially uniformly combine said resin and said aggregate to form a mixture;

said first pumping means being in communication with said mixer and being operative to force said mixture from said mixer through said mixing section of said static mixer, whereby said catalyzed composition is formed of said resin, aggregate, and catalyst.

15. Molding apparatus as set forth in claim 13, further comprising:

purging means for cleaning said static mixer of said catalyzed composition.

16. Molding apparatus as set forth in claim 15, wherein:

said purging means comprise first and second purge valves communicating with said inlet end of said static mixer, said first purge valve further communicating with a supply of suitable solvent and being operative to selectively discharge a quantity of said solvent into said inlet end, and said second purge valve further communicating with a supply of compressed air and being operative to selectively discharge a quantity of said air into said inlet end.

17. A method of molding a product from a catalyzed composition comprising a resin and a catalyst, said method comprising the steps of:

providing a supply of resin, and pumping means associated therewith;

providing a supply of catalyst, and pumping means associated therewith;

providing a static mixer, having longitudinally opposed inlet and outlet ends and an intermediate mixing section;

providing catalyst injection means, disposed generally adjacent said inlet end of said static mixer and being in communication with said catalyst pumping means;

providing a suitable mold having an interior cavity defining the configuration of said product;

pumping a quantity of said resin into said inlet end of said static mixer, thereby creating a substantially uniform flow of said resin through said static mixer;

injecting a quantity of said catalyst into said flow of resin within said static mixer at a point intermediate said inlet end and said mixing section, whereby said catalyst and resin are carried through said mixing section simultaneously to produce a substantially homogeneous catalyzed composition;

providing a fill tube in communication with said outlet end of said static mixer, the distal end of said fill tube being insertable within said mold and being adapted to discharge said catalyzed composition;

discharging said catalyzed composition into a suitable mold; and withdrawing said fill tube from said mold as said catalyzed composition is discharged, at a rate wherein at least a portion of said fill tube remains submerged within said catalyzed composition until said interior cavity of said mold is substantially filled with said catalyzed composition.

18. The method of claim 17, wherein:

said catalyzed composition includes a suitable polymer compound, and said method further comprises the step of injecting a quantity of suitable monomer into said interior cavity of said mold prior to discharging said catalyzed composition.

19. The method of claim 17, further comprising the step of:

rotating said mold to form a vortex within said catalyzed composition discharged into said mold, said portion of said fill tube being submerged substantially in the center of said vortex.

20. A method of molding a product from a catalyzed composition, comprising the steps of:

providing a suitable mold having an interior cavity defining the configuration of said product;

providing a fill tube in communication with a supply of said catalyzed composition, said fill tube being longitudinally moveable between fully inserted and fully retracted positions within said interior cavity of said mold and being adapted to discharge said catalyzed composition therein;

moving said fill tube to said fully inserted position;

discharging said catalyzed composition through said fill tube;

gradually withdrawing said fill tube from said mold as said catalyzed composition is being discharged therefrom, at a rate whereby at least a portion of said fill tube remains submerged within said catalyzed composition until said interior cavity is substantially filled with said catalyzed composition.

21. The method of claim 20, wherein:

said catalyzied composition includes a suitable polymer compound, and said method further comprises the step of injecting a quantity of suitable monomer into said interior cavity of said mold prior to discharging said catalyzed composition.

22. The method of claim 20, further comprising the step of:

rotating said mold to effectuate radially outward flow of said catalyzed composition being discharged therein, whereby said catalyzed composition fills the outer extremities of said interior cavity to substantially eliminate voids in said form.

23. The method of claim 22, wherein:

the rate of rotation of said mold is such that a vortex is formed and maintained within said catalyzed composition discharged in said interior cavity, said portion of said fill tube being submerged in the approximate center of said vortex.

24. The method of claim 20, wherein:

the cross-sectional area of said interior cavity of said mold fluctuates from top to bottom; and the withdrawal rate of said fill tube fluctuates inversely relative to said cross-sectional area corresponding to the position of said submerged portion of said fill tube.

25. A mold having an interior cavity defining the configuration of a product to be formed therein, comprising:

first and second cooperating mating members, each member having an interior side forming approximately half of said interior cavity upon assembly thereof, said first mating member having a generally concave mating surface and said second mating member having a corresponding generally convex mating surface; and means for assembling said first and second mating members to form said interior cavity; wherein said concave and convex mating surfaces are adapted to receive one another in a closely adjacent relationship upon assembly, thereby substantially eliminating the formation of a parting line on said product.

26. A mold as set forth in claim 25, wherein:
said assembling means comprises an outer housing portion adapted to contain said first and second mating members in said closely adjacent relationship.

27. A mold as set forth in claim 26, wherein:
said housing portion includes a generally cylindrical side wall assembly formed in two substantially identical halves, one half of said assembly having said first mating member formed therein, the other half of said assembly having said second mating member formed therein.

28. A mold as set forth in claim 25, wherein:
said first and second mating members are formed from a room temperature vulcanizing compound;
the configuration of said concave mating surface in said first mating member is defined by the naturally occurring meniscus in the surface of said room temperature vulcanizing compound during curing thereof; and
the configuration of said convex mating surface in said second mating member is defined by said concave mating surface in said first mating member, said concave mating surface being operatively utilized as a mold for forming said convex mating surface during curing of said convex mating surface.

29. A mold as set forth in claim 25, wherein:
said assembling means comprises an outer housing portion adapted to contain said first and second mating members in said closely adjacent relationship,
said housing portion including a generally cylindrical side wall assembly formed in two substantially identical halves, one half of said assembly having said first mating member formed therein, the other half of said assembly having said second mating member formed therein; and
said first and second mating members are formed from a room temperature vulcanizing compound, molded in place within said housing portion,
the configuration of said concave mating surface in said first mating member being defined by the naturally occurring meniscus in the surface of said room temperature vulcanizing compound during curing thereof; and
the configuration of said convex mating surface in said second mating member being defined by said concave mating surface in said first mating member, said concave mating surface being operatively utilized as a mold for forming said convex mating surface during curing of said convex mating surface.

30. A method of delivering components of a mixture to a mold for molding a substantially degassed product, comprising the steps of:
mixing said components in a mixer to form said mixture;
evacuating said mixer to remove air from said mixture, thereby forming a substantially degassed mixture;
pumping said degassed mixture from said mixer;
recirculating said degassed mixture in the absence of a vacuum;
transporting said degassed mixture to said mold in the absence of a vacuum; and
discharging said degassed mixture into said mold in the absence of a vacuum.

31. A method in accordance with claim 30, further comprising the step of:
injecting a catalyst into said degassed mixture in the absence of a vacuum without introducing air into said degassed mixture.

32. A method of forming a resilient two-part liner for use in a mold having a rigid outer housing, wherein said outer housing comprises first and second longitudinally separable halves, each having a generally concave side, and said liner has a molding cavity formed therein, said method comprising the steps of:
securing said first half of said outer housing in a horizontal position such that said concave side thereof is facing upward;
pouring a first quantity of a curable liquid into said concave side of said first half of said outer housing, said liquid being curable to produce a resilient material suitable for use in fashioning said liner, the upper surface of said liquid naturally forming a meniscus;
positioning a plug in said curable liquid in said first half, said plug having the same outer configuration as a product to be molded, thereby defining approximately half of said molding cavity within said first quantity of curable liquid;
allowing said curable liquid to cure, thereby forming the first part of said liner, having an outer edge surface;
assembling said second half of said housing to said first half thereof;
pouring a second quantity of said curable liquid into said second half of said housing, thereby defining the remainder of said molding cavity within said second quantity of said liquid; and
allowing said second quantity of liquid to cure, thereby forming the second part of said liner, having an outer edge surface adapted to mate with the outer edge surface in said first part, said outer edge surface in said first part serving as the pattern for said outer edge surface in said second part.

33. A method in accordance with claim 32, wherein:
said outer edge surface of said first part is defined by the naturally forming meniscus in the upper surface of said curable liquid, said outer edge having a generally concave contour resulting from said meniscus; and
said outer edge surface of said second part has a generally convex contour.

34. A method in accordance with claim 32 further including after allowing said curable liquid to cure to form said liner first part, applying a mold release agent to said outer edge surface of said liner first part.

* * * * *